July 3, 1934.  E. P. HALLIBURTON  1,964,913
PROCESS AND APPARATUS FOR FISHING IN THE DRILLING OF OIL WELLS
Filed Oct. 4, 1932  2 Sheets-Sheet 1
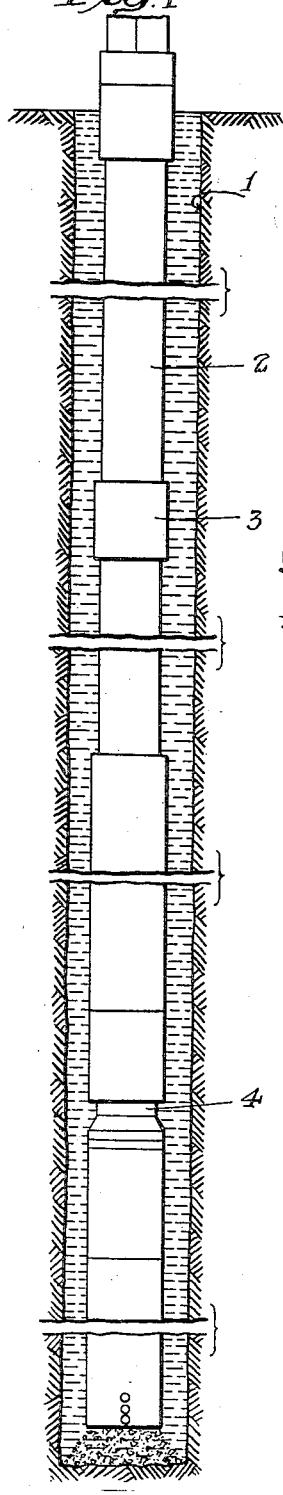
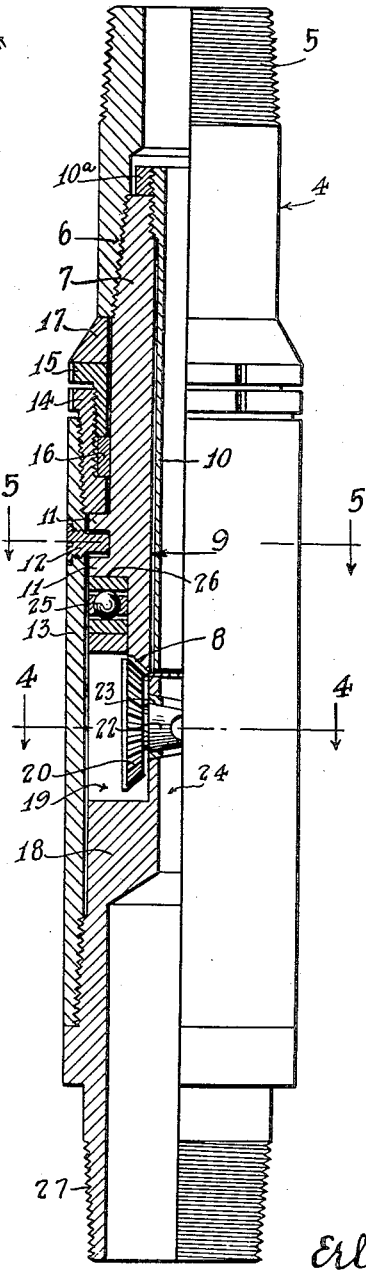
Inventor
Erle P. Halliburton
By Lyon & Lyon
Attorneys July 3, 1934.　　　　E. P. HALLIBURTON　　　1,964,913
PROCESS AND APPARATUS FOR FISHING IN THE DRILLING OF OIL WELLS
Filed Oct. 4, 1932　　　2 Sheets-Sheet 2

Inventor
Erle P. Halliburton
By Lyon & Lyon
Attorneys

Patented July 3, 1934

1,964,913

UNITED STATES PATENT OFFICE 1,964,913

PROCESS AND APPARATUS FOR FISHING IN THE DRILLING OF OIL WELLS

Erle Palmer Halliburton, Los Angeles, Calif., assignor to Halliburton Oil Well Cementing Company, Duncan, Okla., a corporation of Delaware Application October 4, 1932, Serial No. 636,166

7 Claims. (Cl. 294—86)

This invention refers to an apparatus and process for recovering parts of drilling equipment which have been lost in well holes. In the art such lost objects are usually referred to as "fish" and a tool for the purpose as a "fishing tool". A great variety of tools have been devised for the purpose of recovering articles dropped or broken off in the drilling of oil wells. The principal difficulty is securing a suitable engagement between the fish and the recovery apparatus.

It is the general object of the present invention to provide a process and apparatus for insuring a contact between the fishing tool and the lost fish.

More particularly the present invention is designed to provide a process and apparatus for recovering the fish from an oil well in which the fish is caused to engage with a suitable form of fishing tool by the application of fluid pressure in such manner as to draw the fish into contact with the tool.

In the usual practice, the fish is attempted to be engaged with the fishing tool by attaching the fishing tool to a string of drill pipe and the reliance placed upon the motion of the drill pipe to bring about the proper contact. In accordance with the process and apparatus of this invention, means are provided for closing off the drill pipe from the fluid contents of the well during the period that the drill pipe is to be lowered into the well so that the drill pipe will constitute an empty chamber. To this empty chamber is attached a suitable fishing tool, and means are provided whereby when the apparatus arrives at the bottom of the well, or at the location where the fish is to be engaged, the drill pipe may be suddenly opened, with the result that the fluid outside of the drill pipe will attempt to rush into the drill pipe by the fishing tool, causing the lost article to be drawn into contact with the fishing tool. Means are also provided by which, after the lost article has once been engaged by the tool, that the connecting drill pipe may be shut off from the well so that in the operation of raising the pipe, there will be no return flow of fluid and the lost article will thus be firmly held by the fishing tool.

The present invention, together with various additional objects and advantages and features thereof, will be best understood from a description of a preferred process and apparatus for recovering fish or lost articles in well holes, which process and apparatus embodies the invention. For this purpose reference is hereafter made to the accompanying drawings, in which a preferred form or embodiment of the invention is illustrated.

In the drawings:

Figure 1 is an elevation sectionally through a well hole showing the apparatus, certain parts being broken away to contract the view.

Figure 2 is an enlarged elevation mainly in quarter section illustrating the mechanism for opening and closing the chamber of the apparatus.

Figure 3 is an elevation in vertical section of a suitable fishing tool which may be used with the apparatus.

Figure 4:
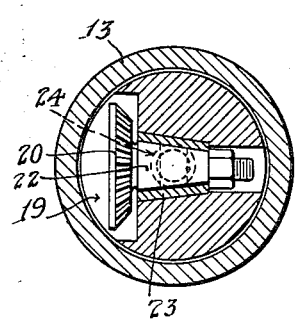
Figure 4 is a section on the line 4—4 of Figure 2.

Referring to the drawings, 1 generally indicates a well hole which, in the usual practice, is filled or mainly filled, with fluid such as mud fluid to near the top of the well.

The apparatus comprises a string of drill pipe tubing or casing 2, which may be of any usual or suitable form and may include a number of sections connected together by couplings or collars 3. To the lower end of this drill pipe tubing or casing is attached the body of an apparatus designed to open and close the bore of the drill pipe 2 from communication with the fluid in the bore of the well 1.

This device comprises a coupling 4 having a threaded stem 5 at its upper end by which it may be attached to the pipe 2. The coupling 4 is also provided with a threaded socket 6 at its lower end which receives the threaded stem of a member 7. The member 7 is provided at its lower end with a bevelled gear 8, which in certain cases may be formed integral with the member 7 or be attached thereto in any suitable manner. Through the member 7 and the gear 8 is a central bore 9, and to the upper end of the bore there is screw-threaded a hollow tube 10 having a head 10ª at its upper end. The head 10ª rests against the upper end of the member 7, and the body of the tube 10 provides a lining for the member 7. This lining in operation prevents the sand and other debris in the drilling well cutting out the member 7. The tube 10 in operation may be replaced as worn without necessitating any replacement of the entire member 7.

The member 7 is further provided with a pair of annular flanges 11 forming an annular groove to receive studs 12 threaded through an outer sleeve 13. The annular groove and the stud 12 thus provide means by which the sleeve 13 and the member 7 are limitably rotatable relative to each other. To the upper end of the sleeve 13 there is threaded packing box 14 having a gland 15 and packing 16. The packing 16 provides a means by which the leaking of fluid into the gears of the device is prevented. Above the gland 15 is indicated a spacer 17.

To the lower end of the sleeve 13 is attached the valve body member 18 of the device and at its upper end is provided with a recess 19 for receiving a bevelled gear 20, which bevelled gear engages the bevelled gear 8. The gear 20 is integral with a stop cock 22 mounted in bushings 23 in the member 18, which stop cock controls the passage of fluid through a bore 24 in the valve member 18. The upper end of the valve member 18 engages a ball bearing 25 disposed in an annular groove in the lower end of the member 7 and engaging an annular shoulder 26 on said member 7.

The lower end of the valve member 18 is provided with means such as the threaded pin 27, by which any number of suitable fishing tools may be attached to the device.

Figure 6:
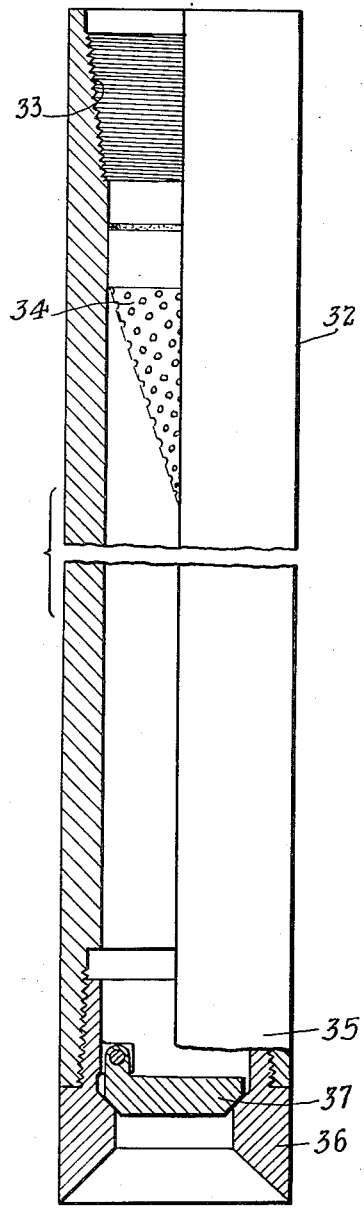
Figure 6 is an elevation mainly in quarter section of a slightly modified fishing tool which may be used in the apparatus.
Figure 5:
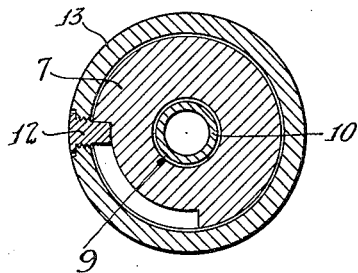
Figure 5 is a section on the line 5—5 of Figure 2.

In Figures 3 and 6 are indicated preferred forms of such fishing tools. Thus, in Fig. 3, 28 indicates the body of a fishing tool provided at its upper end with a threaded socket 29 for engagement with a pin 27 of the member 18. The fishing tool 28 has an open bore and at the lower end is provided with a plurality of spring or catch fingers 30. There is also preferably provided near the upper end of the member 28 a screen 31 for screening out of any fluid passing upwardly through the device any debris in the fluid.

In Figure 6 the form of fishing tool shown comprises the body member 32 with a threaded socket 33 at its upper end for attachment to the pin 27 of member 18. It also includes a screen 34, and at its lower end is provided with a socket 35 to which is attached the body of a check valve 36, which is shown as provided with the valve head 37, in this case of the butterfly type.

In the operation of the apparatus thus described and in the preferred method of recovering fish from oil wells, the apparatus of one of the members 28 or 32 attached thereto is assembled at the top of the well with the stop cock 22 disposed in the closed position so as to prevent the entrance of fluid from the well into the pipe 2 above the cock 22 during the operation of lowering the apparatus into the well hole. The apparatus is then lowered into the well hole in the approximate neighborhood of the fish to be engaged resulting in the pipe 2 constituting an empty chamber leading from the valve or stop cock 22 to the top of the well. The pipe 2 is then rotated to cause the gears 20 and 8 to rotate the cock 22 to the open position, whereupon the fluid in the well outside of the pipe 2, being under a great static head, will rush rapidly into the pipe 2 through the cock 22, creating hydraulic force operating to draw into the fishing tool 28 or 32 any lost article or fish existing in the well. The pipe 2 is then rotated to again close the cock and the apparatus drawn upwardly in the well. This operation seals the fluid in the pipe 2 from return motion. Either the spring finger 30 or the butterfly valve 37 prevents the motion of the fish out of the fishing tool.

A major advantage of the apparatus and process of this invention is that it causes a rapid flow of fluid into the fishing tool, which has the property of carrying into the tool any relatively small article, such as one weighing 75 pounds or thereabout, enabling the engagement of such device with the fishing tool in many cases where it would otherwise be very difficult.

In cases where a large object is to be gripped the buoyant effect of the empty drill pipe will facilitate lifting or pulling the heavy object from the oil well. In case there is a large object stuck in the well hole the tool may be lowered to the object, the valve opened for a short period of time to secure engagement with the fishing tool, leaving a greater portion of the drill pipe empty and, therefore, buoyant. This buoyant property of the drill pipe will materially reduce the load which has to be elevated in the well hole in dislodging the article. Moreover the fact that a rush of fluid may be caused to take place into the fishing tool will frequently operate to break the lost tool free from the earth formation.

The apparatus and process thus described have been found to be in practice very successful in recovering small fish from well holes.

While the particular form of apparatus and process herein described is well adapted to carry out the objects of the present invention, it is to be understood that various modifications and changes may be made without departing from the principles of the invention, and the invention includes all such modifications and changes as come within the scope of the appended claims.

I claim:

1. A process of recovering lost articles or fish from a well, which comprises lowering a fishing tool into the well on the end of a pipe which is closed off from communication with the contents of the well so that an empty chamber is lowered into the well hole, then when the fishing tool is in the neighborhood of the lost article or fish opening the chamber so as to create a flow of fluid from the well into the pipe through the fishing tool, then again closing the pipe from communication with the well hole and elevating the apparatus with the entrapped lost article or fish to the surface of the well.

2. A process of recovering lost articles or fish from a well hole, which comprises attaching a fishing tool to a string of pipe and lowering the same with the pipe closed to the bottom of the well hole, moving the pipe to establish communication between the well hole and the pipe through the fishing tool thereby creating a current of fluid to draw the lost article or fish into the tool, and finally closing the pipe from communication with the well and raising the same to the surface.

3. An apparatus for recovering fish from an oil well, which comprises a means providing an empty chamber adapted to be lowered into a well hole and when so positioned extending to the top of the well, a hollow tool attached thereto and provided with means for engagement with the fish to be recovered, and means for opening and closing said empty chamber so as to permit a flow of fluid through the tool in the operations of engaging the fish.

4. An apparatus for recovering fish from an oil well, which comprises a means forming an empty chamber adapted to be lowered into the well hole and when so positioned extending to the top of the well, a hollow fish engaging tool attached to said empty chamber, and means for opening and closing said empty chamber adapted to be actuated by motion of a supporting pipe.

5. An apparatus for recovering fish from an oil well, comprising a string of pipe adapted to be lowered into the well hole, a valve member attached to said pipe and adapted to maintain the same closed and empty during the operations of lowering the apparatus in the well hole, the string of pipe providing a passage from the valve to the top of the well unrestricted against the flow of fluid, means for operating said valve member adapted to be controlled by motion of the pipe, and a hollow fish catching member attached to the lower end of said valve means in position so that fluid will flow upwardly through said member when said valve is opened.

6. An apparatus for recovering fish from an oil well, comprising a string of pipe adapted to be lowered into the well hole and providing an empty chamber from near the bottom of the well to the top of the well, a valve member attached to said pipe and adapted to maintain the same closed and empty during the operations of lowering the apparatus in the well hole, the string of pipe providing a passage from the valve to the top of the well unrestricted against the flow of fluid, means for operating said valve member adapted to be controlled by motion of the pipe, and a hollow fish catching member attached to the lower end of said valve means in position so that fluid will flow upwardly through said member when said valve is opened.

7. An apparatus for recovering fish from an oil well, comprising a string of pipe adapted to be lowered into the well hole, a valve member attached to said pipe near its lower end and adapted to maintain the same closed and empty during the operations of lowering the apparatus in the well hole, the string of pipe providing a passage from the valve to the top of the well unrestricted against the flow of fluid, means for operating said valve member adapted to be controlled by motion of the pipe, and a hollow fish catching member attached to the lower end of said valve means in position so that fluid will flow upwardly through said member when said valve is opened.

ERLE PALMER HALLIBURTON.